Patented Sept. 19, 1950

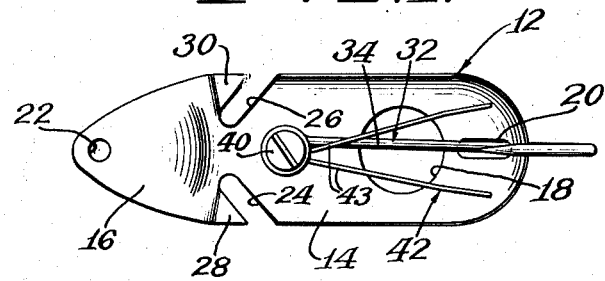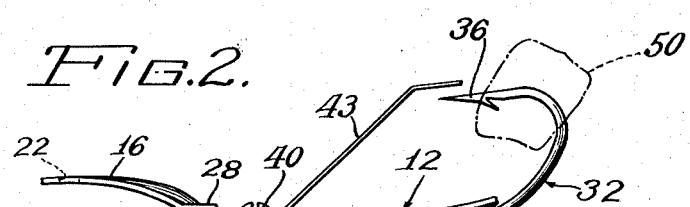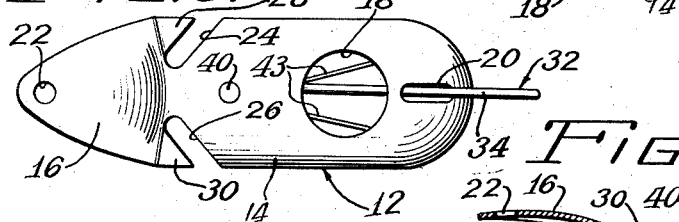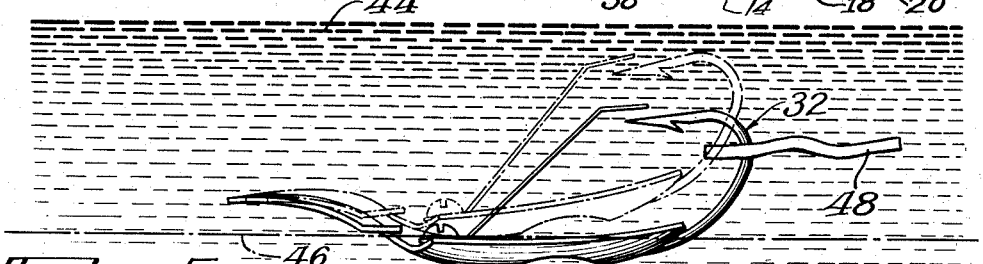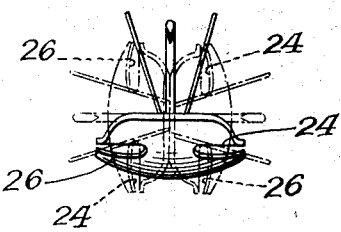

2,522,725

UNITED STATES PATENT OFFICE 2,522,725

FISHING LURE

Robert P. Schiffmann, Chicago, Ill.

Application April 2, 1949, Serial No. 85,190

5 Claims. (Cl. 43—42.06)

This invention relates to an artificial fishing lure. As is well known in the art an artificial fishing lure must in various respects, simulate live bait as closely as possible, and for this purpose it must be kept moving while being reeled in, following the casting operation. The lure should also preferably roll or twist while being drawn through the water to create a disturbance of the water and thereby further simulate live bait.

In order to more fully bring out the advantages of the present invention, a brief statement of one of the main disadvantages of previous devices will now be pointed out. Previous lures have been made so as to revolve or twist while being reeled in, following the casting operation, and the construction has been such that they rolled or twisted in only one direction continuously, with the result that the line became twisted and consequently easily fouled.

An object of the present invention is the provision of an artificial fishing lure which, when in use, is caused to first roll in one direction to an extent less than a full revolution, and then roll in the opposite direction a like extent, with the result that the line does not become twisted or fouled.

More specifically, an object of the invention is the provision of an artificial fishing lure having a characteristic shape and arrangement of elements by reason of which the lure is caused to roll in opposite directions, or oscillate, while being drawn through the water.

The lure of the present invention is spoon-shape, having its concave side normally disposed upwardly, and is provided with an upwardly bent tongue at its leading end, the tongue having a forwardly and downwardly facing concave surface, and is provided with gill slots between the spoon-shape portion and the tongue portion. The various shapes of the elements making up the lure and their correlation being such as to cause the rolling action above referred to.

Another object is the provision of an artificial fishing lure of the character above referred to which is adapted for use in surface casting and also for depth casting.

Still another object is the provision of an artificial fishing lure of the character above referred to, which by means of employing different weights of auxiliary bait, such as a pork chunk, the lure can be caused to ride below the surface of the water with a rolling, wiggling, wobbling action, or ride the surface of the water without rolling action.

A further object of the invention is the provision of an artificial fishing lure which is caused to roll, wiggle and wobble as it moves through the water, creating a sound and disturbance of the water and thereby simulating live bait.

With these and other objects in view, my invention consists in the construction, arrangement and combination of the various elements or features of my device, whereby the objects contemplated are attained, as hereinafter more fully set forth, pointed out in my claims and illustrated in the accompanying drawings, wherein:

Figure 1 is a top view of the new fishing lure of the present invention;

Figure 2 is a side view of the lure;

Figure 3 is a bottom view of the lure;

Figure 4 is a longitudinal sectional view of the lure;

Figure 5 is a front end view showing in dotted lines the extreme positions assumed in the rolling action of the lure; and Figure 6 is a side view of the lure illustrating graphically two different relative positions of the lure assumed in the rolling action.

Referring now in detail to the drawings, the lure as represented in Figures 1 to 5 is designed for moving toward the left in the reeling in portion of the casting operation, and includes a body, a hook and a weed wire. The body 12 is in the form of a stamped sheet metal piece, and includes a main portion 14 and a forwardly extending tongue portion 16. The main body portion 14 is generally elongated having substantially straight lateral edges, and is spoon-shape, being curved on each of transverse axes. The main portion 14 is provided with an opening 18, slightly rearward of the center, effective for reducing the weight of the lure, and another opening 20 in the form of an elongated slot disposed adjacent the trailing end of the main portion.

The lure, in use, is adapted to be disposed with the concave side of the main portion 14 disposed upwardly, or generally so, and in the rolling action which will be referred to later, the lure rolls out of the position referred to, but for convenience in describing the invention, the lure will be referred to as having the concave side of the main portion 14 disposed upwardly.

The tongue portion 16 is bent slightly upwardly from the main portion 14 and is also curved on each of transverse axes, presenting a concave side disposed generally forwardly and downwardly. At the leading end of the tongue portion 16 is a hole 22 for attaching a fish line or leader.

At the juncture between the main portion 14 and tongue portion 16 is a pair of gill slots 24 and 26 which are cut in from the lateral edges of the lure and extend inwardly and forwardly therefrom. The slots 24 and 26 thus form rearwardly extending tips or gills 28 and 30. As shown particularly in Figures 2 and 4 the tips or gills 28 and 30 are bent slightly upwardly from the general contour of the tongue portion 16 so that they are directed rearwardly substantially over the open concave side of the body of the lure. The trailing edges of the gill slots are therefore disposed below the gills 28 and 30, and positioned for cutting into the water as the lure is moved through the water as illustrated best in Figures 2 and 5.

A hook is illustrated at 32 and comprises a shank 34 and a barbed terminal end 36 which forms the hook proper. The forward end of the shank 34 is provided with an eyelet 38 through which a screw 40 is inserted, the screw being also threaded into a tapped opening in the main portion 14 adjacent the forward end of the latter, mounting the hook securely in place on the lure. The shank 34 extends rearwardly over the opening 18, and through the opening 20 and rearwardly beyond the lure. The barbed end 36 of the hook is thereby disposed in bent over relation with respect to the body of the lure and is spaced from the concave side thereof.

A weed guard wire 42, made of light spring wire, is provided for guarding the hook from entanglement with weeds. The guard wire 42 is bent to form two leg portions 43, and an eyelet through which the screw 40 extends and by means of which the wire is secured to the lure. The guard wire and hook are thus secured or mounted on the lure by a single securing means in the form of the screw 40. The two legs 43 diverge and extend rearwardly and upwardly from the body of the lure and the terminal ends of the legs terminate at positions slightly rearwardly and above the barbed portion 36 of the hook. The weed wires 42 prevent the entanglement of weeds with the hook 32 when the lure is reeled in.

Reference is directed to my copending application Serial No. 27,793 filed May 18, 1948 which discloses and claims broadly a fishing lure having features common to the present invention.

As stated heretofore, the lure is designed for rolling action and moreover is designed for an oscillating rolling action, that is, it rolls in one direction less than a full revolution and then in the other direction a like amount, so that the lure does not continuously roll or twist in only one direction. The following is an explanation of the reasons why such action takes place. It is difficult to observe closely the action of the lure while it is in motion because of the speed with which it is reeled in, and it is believed however that the following action takes place.

Figure 6 illustrates a body of water 44 and the numeral 46 indicates a register line which is only for the purpose of indicating various relative positions of the lure in the rolling action. A pork strip 48, as illustrated in Figure 6, is placed on the hook. Such a pork strip, as is well known to fishermen, is not weighty, and may be in the range of a half inch wide and three or four inches long and of minor thickness. These dimensions are of course only examples. When the lure is cast the weight of the hook 32 tends to lower the rear end of the lure to the position illustrated in full lines in Figure 6 so that the lure slopes downwardly and rearwardly. Then as the reeling-in operation begins, with the lure sloping downwardly and rearwardly, the water flows through the opening 18 against the inner concave side of the main portion 14 at the extreme rear thereof. The action of the water is not exactly uniform and the lure tends to roll to one side or the other. Assume it first rolls clockwise and approaches the position shown in dotted lines at the left of Figure 5, and in dotted lines in Figure 6. In this position the weight of the hook 32 no longer tends to weight the rear end of the lure downwardly (that is, in the direction of the convex side of the main portion).

The lure in the dotted line position in Figure 6 would not be viewed in the same direction as in the full line position of Figure 6, but the views are superimposed to bring out the comparison in different positions of the lure in the rolling action, with respect to the alignment of the lure relatively to the line of travel of the lure. The lure in the dotted line position is as viewed downwardly, when the lure has rolled or rotated approximately 90° from the full line position, while the lure in the full line position is as viewed from the side.

When the tendency to weight the rear end of the lure downwardly is eliminated the forward motion of the lure causes relative rearward motion of the water, and the water strikes the under convex side of the main portion 14 and tends to move it to the relative position shown in dotted lines in Figure 6, i. e., to that position wherein the rear end of the body of the lure and the extreme forward end of the tongue portion 16 are more nearly in the line of movement of the lure.

In the dotted line position at the left in Figure 5, water rushes through the gill slots 24 and 26 and washes against the extreme rear end of the main portion 14. This action tends to roll the lure in the opposite direction or toward that position shown at the right of Figure 5. When the lure is in the position at the right of Figure 5, the action is reversed, that is, the water rushing through the gill slots 24 and 26 strikes the rear end of the main portion 14 and tends to roll it in the opposite direction. The rolling action referred to is known as a three-quarter turn, that is, the lure moves into three quarter turn positions out of four, in other words, it moves through a range of 180°.

The pork strip 48 is not sufficient to prevent or deter the rolling action, not having sufficient weight to retain the lure in its original position. The pork strip acts more like a streamer trailing behind the lure.

The rolling action above described takes place in depth casting, that is, when the lure is below the surface of the water with a pork strip thereon or other weight. The lure is reeled in slowly after being cast, producing most effective rolling action.

For surface casting a pork chunk as illustrated at 50 in Figure 2 is employed. Such a pork chunk is considerably more weighty than a pork strip and may be of a desired size, such as for example, 1 inch by ⅞ inch by ⅜ inch. Such a pork chunk is of considerable weight compared with the weight of the lure, serves to stabilize the lure to prevent its rolling from one side to the other. For surface casting with a pork chunk, the lure is cast and then immediately reeled in and at a more rapid rate than in the case of depth casting. The pork chunk stabilizing the lure causes the bottom convex surface of the main portion 14 to ride over the surface of the water and the lower concave side of the tongue portion 16 acts as a sea sled or surf board.

In either type of casting the lure creates a disturbance of the water and creates sound, simulating live bait.

While I have herein shown and described a preferred form of my invention, manifestly it is susceptible of modification and rearrangement of the elements without departing from the spirit and scope thereof. I do not, therefore, wish to be understood as limiting my invention to the precise form herein disclosed, except as I may be so limited by the appended claims.

I claim as my invention:

1. In a fishing lure, a main spoon-shape portion having a concave side, a hook mounted on said main portion, and a bent tongue portion extending forwardly and upwardly with respect to said concave side of said main portion, said lure having gill slots in the lateral edges thereof adjacent the juncture between said main portion and said tongue portion, said slots forming tips extending rearwardly from said tongue portion, said tips being bent upwardly so as to be directed substantially across the concave side of the lure.

2. In a fishing lure, a main spoon-shape portion having a concave side adapted to be disposed upwardly in the casting operation, said main portion being curved on each of transverse axes, said main portion having an opening therethrough disposed adjacent the center and adjacent the lowermost part of the concave contour, said opening being of substantial dimension in each of its transverse directions relative to the width of the main portion, a hook mounted on said main portion, and an upwardly bent tongue portion extending forwardly from said main portion, said tongue portion having a concave side directed forwardly and downwardly, said tongue portion being curved on each of transverse axes, said lure having gill slots in its lateral edges adjacent the juncture between said main portion and said tongue portion, said slots extending inwardly and forwardly from the lateral edges in diagonal relationship to the longitudinal center line of the lure, said slots forming pointed tips extending rearwardly from said tongue portion, said tips being bent upwardly so as to be directed substantially across the concave side of said main portion.

3. In a fishing lure, a main spoon-shape portion having a concave side adapted to be disposed upwardly while the lure is being moved, a hook mounted on said main portion, and a tongue portion extending forwardly from said main portion, said tongue portion having a concave side directed forwardly and downwardly, said lure having slots in opposite lateral edges thereof at substantially the juncture between said main portion and said tongue portion, said slots extending inwardly and forwardly from the lateral edges of the lure in diagonal relationship to the longitudinal center line of the lure, said slots forming pointed tips on said tongue portion extending rearwardly and outwardly from the tongue portion, the outer lateral edges of said tips extending substantially rearwardly and being substantially in longitudinal alignment with the lateral edges of said main portion.

4. In a fishing lure, a main spoon-shape portion having a concave side adapted to be disposed upwardly while the lure is being moved, a hook mounted on said main portion, and a tongue portion extending forwardly from said main portion, said tongue portion having a concave side directed forwardly and downwardly, said lure having slots in opposite lateral edges thereof at substantially the juncture between said main portion and said tongue portion, said slots extending inwardly and forwardly from the lateral edges of the lure in diagonal relationship to the longitudinal center line of the lure, said slots forming pointed tips on said tongue portion extending generally rearwardly from the tongue portion, the lateral edges of said tongue portion including the outer lateral edges of said tips forming a longitudinal continuation of the lateral edges of said main portion.

5. In a fishing lure, a main spoon-shape portion having a concave side adapted to be disposed upwardly while the lure is being moved, a hook mounted on said main portion, said main portion having an opening therethrough disposed adjacent the center and adjacent the lowermost part of the concave contour, said opening being of substantial dimension in each of its transverse directions relative to the width of the main portion, and a tongue portion extending forwardly from said main portion, said tongue portion having a concave side directed forwardly and downwardly, said lure having slots in opposite lateral edges thereof at substantially the juncture between said main portion and said tongue portion, said slots extending inwardly and forwardly from the lateral edges of the lure in diagonal relationship to the longitudinal center line of the lure.

ROBERT P. SCHIFFMANN.

REFERENCES CITED

The following references are of record in the file of this patent:

UNITED STATES PATENTS

| Number | Name | Date |
| --- | --- | --- |
| 1,123,717 | Fey | Jan. 5, 1915 |
| 1,303,467 | Ettershank | May 13, 1919 |
| 1,422,457 | McClanahan | July 11, 1922 |
| 1,589,258 | Stanley | June 15, 1926 |
| 1,888,641 | Toepper | Nov. 22, 1932 |
| 2,145,283 | Accetta | Jan. 31, 1939 |
| 2,168,476 | Hartung | Aug. 8, 1939 |